US008136188B2

(12) United States Patent
Bell

(10) Patent No.: US 8,136,188 B2
(45) Date of Patent: Mar. 20, 2012

(54) COMBINATION PIPE CUTTER AND CAN LID OPENER AND METHOD OF USE THEREOF

(76) Inventor: Timothy Bell, Villa Rica, GA (US)

( * ) Notice: Subject to any disclaimer, the term of this patent is extended or adjusted under 35 U.S.C. 154(b) by 0 days.

(21) Appl. No.: 12/116,858

(22) Filed: May 7, 2008

(65) Prior Publication Data

US 2009/0277310 A1 Nov. 12, 2009

(51) Int. Cl.
*B67B 7/18* (2006.01)
*B67B 7/44* (2006.01)
*B23D 21/10* (2006.01)
*B26D 3/16* (2006.01)
*B25B 7/22* (2006.01)

(52) U.S. Cl. .................................... 7/156; 7/134; 30/92

(58) Field of Classification Search .............. 7/156, 151, 7/152, 131, 134, 142, 135; 30/410, 416, 30/417, 418, 422, 92, 251; 81/3.44, 3.47
See application file for complete search history.

(56) References Cited

U.S. PATENT DOCUMENTS 56,166 A * 7/1866 Boardman ...................... 81/437
667,914 A * 2/1901 Gilchrist .......................... 7/131
990,543 A * 4/1911 Gilchrist ......................... 30/363
1,276,323 A * 8/1918 Buresch ......................... 53/344
1,511,340 A * 10/1924 Jackson ........................... 81/60
1,814,014 A * 7/1931 Vitali ............................... 7/132
1,889,556 A * 11/1932 Lane .............................. 81/306
2,009,171 A * 7/1935 Fowler ........................... 30/432
2,027,785 A * 1/1936 Rauh ............................. 81/3.56
2,131,395 A * 9/1938 Voss .............................. 81/3.56
2,265,148 A * 12/1941 Costello ......................... 30/432
2,621,403 A * 12/1952 Capriotti ........................ 30/418
2,651,226 A * 9/1953 Hopmann ...................... 81/3.09
2,691,909 A * 10/1954 Hopmann ...................... 81/3.56
2,778,254 A * 1/1957 Carapellotti .................. 81/3.56
2,823,395 A * 2/1958 Brownson ......................... 7/128
2,925,653 A * 2/1960 Stallard .......................... 30/416
3,538,787 A * 11/1970 Briar et al. ...................... 30/419
3,760,473 A * 9/1973 Studdard ..................... 407/29.1
3,808,617 A * 5/1974 Lindsten ........................... 7/126
3,817,126 A * 6/1974 Koebbeman .................. 81/3.44
3,947,905 A * 4/1976 Neff ................................. 7/107
RE30,613 E * 5/1981 Nakamura et al. ................ 30/94
4,658,456 A * 4/1987 Tsai ................................. 7/135
4,669,140 A * 6/1987 Miceli ............................... 7/158
(Continued)

FOREIGN PATENT DOCUMENTS

CN 201010502 * 1/2008
(Continued)

*Primary Examiner* — David B Thomas
(74) *Attorney, Agent, or Firm* — Williamson Intellectual Property Law, LLC; Thomas R. Williamson, III

(57) ABSTRACT

A combination pipe cutter and can lid opener comprising a means for cutting and a means for opening a can having a lid. The combination pipe cutter and can lid opener comprises two handles, one having a holder to hold a pipe and the other having a blade, wherein the blade is utilized to cut the pipe in the holder. The insides of the handles comprise semicircular openings having gripping teeth for opening the lid of a container. To open the lid of the container, the semicircular cutouts of the first handle and second handle are positioned around the perimeter of the lid, wherein the gripping teeth cooperatively engage the lid thereby opening the container by turning the combination pipe cutter and can lid opener.

10 Claims, 3 Drawing Sheets

U.S. PATENT DOCUMENTS

D292,866 S * 11/1987 Barnett ........................ D8/41
4,747,173 A * 5/1988 Marceau ........................ 7/156
4,815,210 A * 3/1989 Burrage ........................ 30/176
D337,248 S * 7/1993 Tanfoglio ........................ D8/57
5,267,366 A * 12/1993 Frazer ........................ 7/128
5,430,945 A * 7/1995 Huang ........................ 30/410
5,497,522 A 3/1996 Chen
5,575,029 A 11/1996 Simpson
5,581,897 A * 12/1996 Liebscher ........................ 30/416
5,724,688 A * 3/1998 Chen ........................ 7/128
D407,286 S * 3/1999 Seber et al. ........................ D8/55
5,894,617 A * 4/1999 Liou ........................ 7/107
5,970,618 A * 10/1999 Kuo ........................ 30/434
6,012,357 A * 1/2000 John ........................ 81/9.44
6,023,805 A * 2/2000 Lin ........................ 7/128
6,029,297 A 2/2000 French
6,041,460 A * 3/2000 Cholewinski ........................ 7/156
6,047,426 A * 4/2000 McIntosh et al. ........................ 7/129
6,058,613 A * 5/2000 So ........................ 30/418
6,148,527 A * 11/2000 Pereira ........................ 30/417
6,178,855 B1 * 1/2001 Bally et al. ........................ 81/355
6,289,768 B1 9/2001 Anderson et al.
6,318,218 B1 * 11/2001 Anderson et al. ........................ 81/440
6,374,502 B1 * 4/2002 Holcomb et al. ........................ 30/417
6,430,768 B2 * 8/2002 McIntosh et al. ........................ 7/129
6,619,158 B2 * 9/2003 Bates et al. ........................ 81/9.4
6,769,331 B2 8/2004 Berg et al.
6,789,325 B2 * 9/2004 Wilson ........................ 30/416
6,983,505 B2 * 1/2006 McIntosh et al. ........................ 7/129
7,021,177 B2 4/2006 Lovemark et al.
7,051,627 B2 * 5/2006 Rivera ........................ 81/440
7,146,668 B2 * 12/2006 Rivera ........................ 7/128
7,150,210 B2 * 12/2006 Berg et al. ........................ 81/427.5
7,210,378 B1 5/2007 Bibi
7,373,858 B1 * 5/2008 Hawkins ........................ 81/3.55
D581,233 S * 11/2008 Sullivan ........................ D8/60
2002/0069729 A1 * 6/2002 Anderson et al. ........................ 81/440
2002/0184714 A1 * 12/2002 McIntosh et al. ........................ 7/129
2005/0051000 A1 3/2005 McIlvenna et al.
2006/0225538 A1 * 10/2006 Brown ........................ 81/90.2
2006/0236823 A1 10/2006 MacLain

FOREIGN PATENT DOCUMENTS

CN 201010502 Y 1/2008
JP 2007275462 A * 10/2007

* cited by examiner

COMBINATION PIPE CUTTER AND CAN LID OPENER AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to a combination pipe cutter and can lid opener, and method of use thereof, and more specifically to a combination pipe cutter and can lid opener that provides a means for cutting pipe and a means for opening and/or gripping the lid of a can, or the like.

2. Description of Related Art

A variety of tools are utilized by carpenters and construction workers to cut pipes and/or open containers. As a result, workers often carry multiple tools. However, transporting multiple tools is cumbersome because it requires a worker to carry several tools around while working. As such, multi-functional tools are beneficial because workers can accomplish tasks while minimizing the burden of carrying multiple tools. However, multi-functional tools do not typically have the ability to allow a worker to open containers.

To relieve the difficulty of transporting multiple tools, one previous device teaches a combinational tool having a first blade and a second blade pivoted in the middle. Notches are respectively made on the first and second blades forming a socket wrench. While this device is suitable for stripping and/or crimping wires, it is not suitable for gripping and subsequently opening glue containers.

Another device comprises a wrench, wherein the wrench has a first and second handle with internal jaws at the proximate end of the handle section. While this device allows a user to unscrew bolts, the device does not have a gripping mechanism within the handles of the wrench to open containers.

Therefore, it is readily apparent that there is a need for an apparatus that allows a user to both cut materials and open containers, wherein the user opens containers via a gripping mechanism along the inside of the handles of the apparatus.

BRIEF SUMMARY OF THE INVENTION

Briefly described, in a preferred embodiment, the present invention overcomes the above-mentioned disadvantages and meets the recognized need for such a apparatus by providing a combination pipe cutter and can lid opener, and method of use thereof, wherein the combination pipe cutter and can lid opener comprises a cutter to cut objects, and a gripper to open the lid of a container. The combination pipe cutter and can lid opener comprises a blade, a pipe holder and two handles, wherein the handles comprise an inside and an outside, and wherein the insides of the handles comprise semicircular openings having gripping teeth. The pipe holder is semicircular in shape to retain a portion of pipe therewithin, and further has a slot to allow the blade to pass fully through the pipe being cut. Accordingly, the apparatus allows a user to cut materials and also grip and open containers via the handles.

According to its major aspects and broadly stated, the present invention in its preferred form is a combination cutter and can lid opener comprising a means for cutting and a means for opening a can. The combination cutter and can lid opener comprises two handles, each having an outside and an inside, wherein the insides comprise semicircular openings having gripping teeth. The semicircular openings preferably extend completely through the inside of the handles, or, in an alternate embodiment, the semicircular openings extend partially through the inside of the handles. By use of a partial opening, the handles are strengthened. The two handles are secured together via a hinge, thereby enabling the handles to perform a scissors operation. The outside of at least one of the two handles comprises hand grips to support the user's grasp on the handle. One of the two handles comprises a top having a pipe holder and a blade gap to receive a blade, and the other of the two handles comprises a top having the blade.

The combination pipe cutter and can lid opener provides a method for cutting an object, wherein a user obtains a combination pipe cutter and can lid opener, places the object for cutting, such as, for exemplary purposes only, a pipe, between the blade and one of the two handles and applies pressure to the outside of the two handles until they contact, thereby cutting the object with the blade.

The combination pipe cutter and can lid opener provides a method of opening and/or gripping an object by placing a lid of a container between the semicircular openings of the two handles and applying pressure to the outsides of the two handles until the gripping teeth of the semicircular openings securely engage the perimeter of the lid. The combination pipe cutter and can lid opener is subsequently twisted, thereby loosening and/or removing the lid from the container.

Thus, the combination pipe cutter and can lid opener is a multi-functional tool that allows the user to cut materials as well as open and/or grip the lid of containers of multiple sizes and configurations.

More specifically, the present invention is a combination pipe cutter and can lid opener, wherein the combination pipe cutter and can lid opener comprises a first handle and a second handle, and wherein the first handle and the second handle form an "X" shape and are secured via a hinge. The hinge is such as is known in the art for opposing handle sections to operate in a 'scissors' fashion.

The first handle comprises an inside, an outside, a top and an end, wherein the outside comprises hand grips to provide a better grip of the combination pipe cutter and can lid opener, and wherein the top comprises a blade for cutting objects. The inside of the lower portion of the first handle further comprises a cutout, wherein the cutout in the preferred embodiment extends completely through the inside of the first handle from top to bottom, and wherein the cutout comprises gripping teeth to open the lid of a can by cooperately engaging with a similar gripping area on the inside of the lower portion of the second handle as described more fully hereinbelow.

The second handle comprises an outside, an inside, a cutout, a top, an end and optionally a clip. The top comprises a gap and a receiver to accommodate the blade of the first handle. The outside of the second handle may comprise hand grips for a user to grip the second handle, wherein the inside of the second handle comprises a cutout that extends entirely through the inside of the second handle from front to back, and wherein the cutout comprises gripping teeth to engage and open the lid of a can.

When the first handle and second handle form an "X" shape, a gap is formed between the top of the first handle and the top of the second handle. To cut an object, such as a pipe, the pipe is placed in the gap. Pressure is applied to the first and second handle and the blade moves through the pipe in the gap toward the top of the first handle until the blade is within the receiver, thereby cutting the pipe. It will be recognized by those skilled in the art that various cutting devices could be incorporated into the top end of the combination pipe cutter and can lid opener for the purpose of cutting through sections of pipe or tubing.

To open an object, such as, for exemplary purposes only, a lid of a glue container, the cutout of the first handle and the cutout of the second handle are positioned around the perimeter of the lid so that the gripping teeth of the cutouts cooperatively engage the lid. Pressure is applied to the first handle and the second handle and the combination pipe cutter and can lid opener is subsequently twisted, thereby opening the lid and providing access to the contents of the glue container.

When not in use, the combination pipe cutter and can lid opener is stored by applying pressure to the first handle and the second handle until the first handle and the second handle move proximate one another. The ends of the first and second handles are secured via an optional clip on the end of one of the handles. It will be recognized by those skilled in the art that the end of the first handle and the end of the second handle may be secured by any means known in the art, such as, for exemplary purposes only, a clasp or a piece of wire.

In an alternate embodiment, the combination pipe cutter and can lid opener comprises a first and second handle with the inside of the lower portions of the first and second handles comprising cutouts having gripping teeth therein. The cutouts extend only partially through the inside of the first and second handles partially from front to back, thereby providing a non-cutout portion that provides additional strength to the first and second handles when gripping and/or opening containers.

Accordingly, a feature and advantage of the present invention is its ability to be utilized for a both cutting and opening and/or gripping a variety of objects.

Another feature and advantage of the present invention is its ability to open containers of various sizes.

Yet another feature and advantage of the present invention is its ability to be stored easily and safely.

Yet still another feature and advantage of the present invention is its ability to combine a gripping and cutting instrument into one tool.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-3B, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
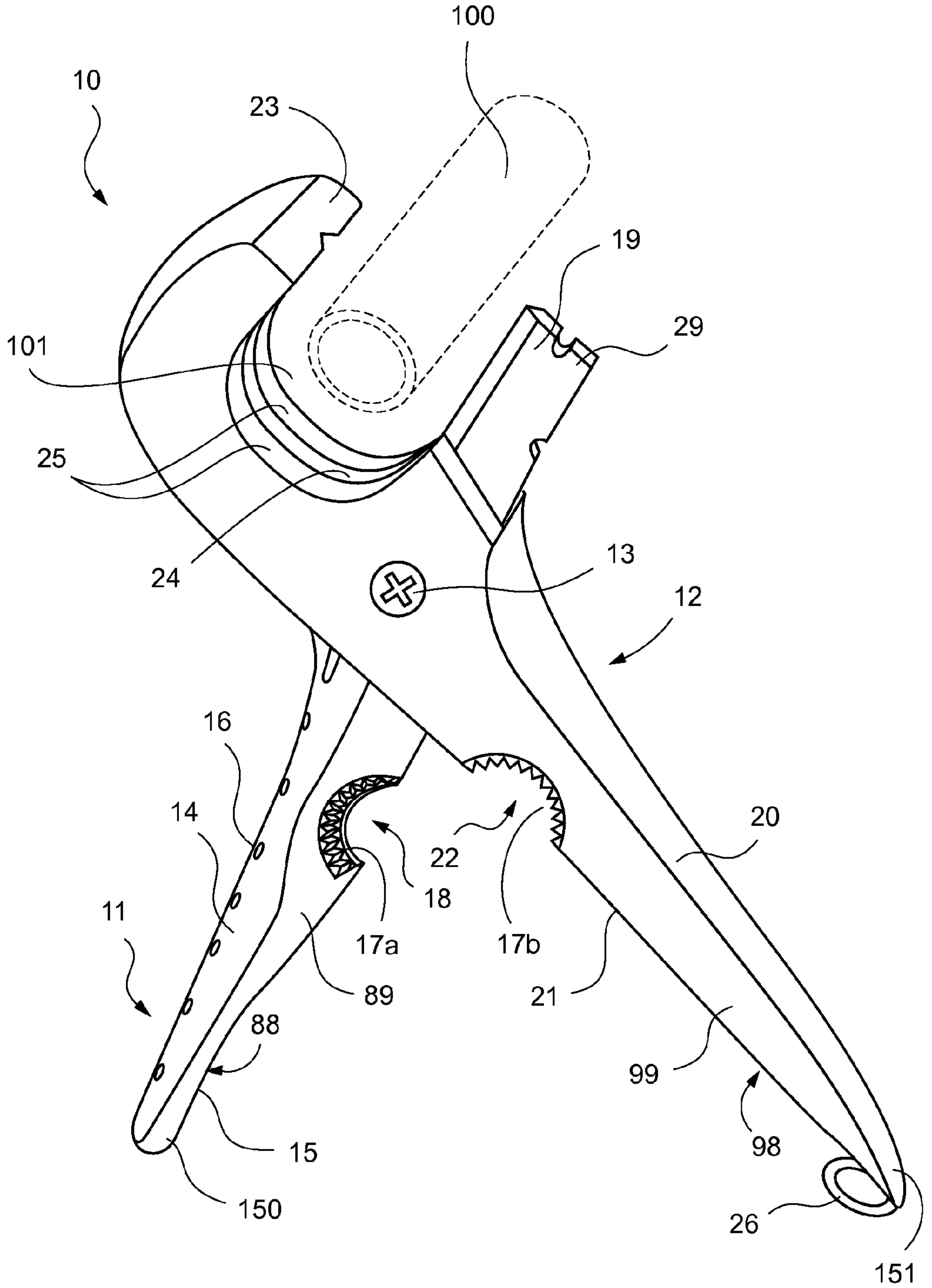
FIG. 1 is a perspective view of a combination pipe cutter and can lid opener according to a preferred embodiment.

Referring now to FIG. 1, a preferred embodiment comprises combination pipe cutter and can lid opener 10, wherein combination pipe cutter and can lid opener 10 comprises first handle 11 and second handle 12. First handle 11 comprises outside 14, inside 15, top 29 and end 150, wherein outside 14 comprises hand grips 16, and wherein top 29 comprises blade 19. Inside 15 comprises cutout 18, wherein cutout 18 extends through inside 15 from front 89 to back 88, and wherein cutout 18 comprises gripping teeth 17*a* to engage lid L (best shown in FIG. 2).

Figure 2:
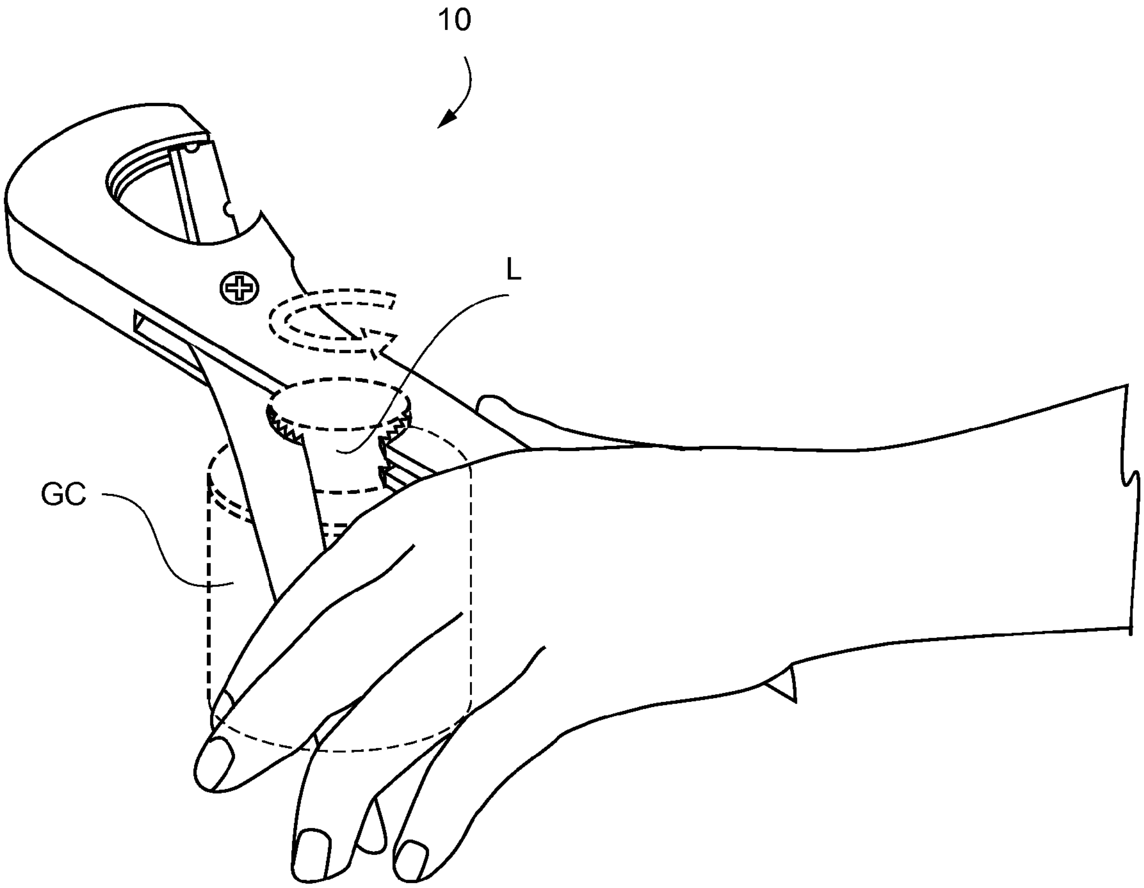
FIG. 2 is a perspective view of a combination pipe cutter and can lid opener according to a preferred embodiment, shown in use opening a glue can.

Second handle 12 comprises outside 20, inside 21, top 23, end 151 and clip 26, wherein inside 21 comprises cutout 22, and wherein cutout 22 extends through inside 21 from front 99 to back 98, and wherein cutout 22 comprises gripping teeth 17*b* to cooperately engage lid L (best shown in FIG. 2). Top 23 comprises blade gap 24 and receiver 25, wherein blade 19 moves through blade gap 24 into receiver 25. It will be recognized by those skilled in the art that second handle 12 could optionally comprise hand grips 16 (not shown) similar to first handle 11.

First handle 11 and second handle 12 form an "X" shape when opened and are secured via hinge 13. Hinge 13 is such as is known in the art for opposing handle sections to operate in a 'scissors' fashion.

When first handle 11 and second handle 12 are opened and in an "X" shape, gap 101 is formed between top 29 of first handle 11 and top 23 of second handle. In use, pipe 100 is placed in gap 101, resting in receiver 25. Pressure is then applied to first handle 11 and second handle 12, wherein first handle 11 and second handle 12 move toward each other, thereby moving blade 19 toward top 23 of first handle 11 until blade 19 is within blade gap 24, thereby cutting pipe 100. While second handle 12 is generally shown as comprising portions disposed on both sides of first handle 11, it will be recognized by those skilled in the art that second handle 12 could be disposed on only one side of first handle 11, wherein blade gap 24 would not be required, and wherein blade 19 would sever pipe 100 by passing proximate and on the side of receiver 25.

When not in use, combination pipe cutter and can lid opener 10 is stored by applying pressure to first handle 11 and second handle 12 until first handle 11 and second handle 12 are generally parallel to and are proximate one another, wherein end 150 of first handle 11 and end 151 of second handle 12 are secured via optional clip 26. It will be recognized by those skilled in the art that end 150 of first handle 11 and end 151 of second handle 12 may be secured by any means known in the art, such as, for exemplary purposes a clasp, a piece of wire, or the like.

Referring now to FIG. 2, in use, combination pipe cutter and can lid opener 10 opens lid L of glue container GC by placing cutout 18 and cutout 22 around the perimeter of lid L, wherein gripping teeth 17*a*, 17*b* cooperatively engage lid L. Pressure is applied to first handle 11 and second handle 12 and combination pipe cutter and can lid opener 10 is turned, wherein combination pipe cutter and can lid opener 10 opens lid L, thereby providing access to contents of glue container GC.

Figure 3A:
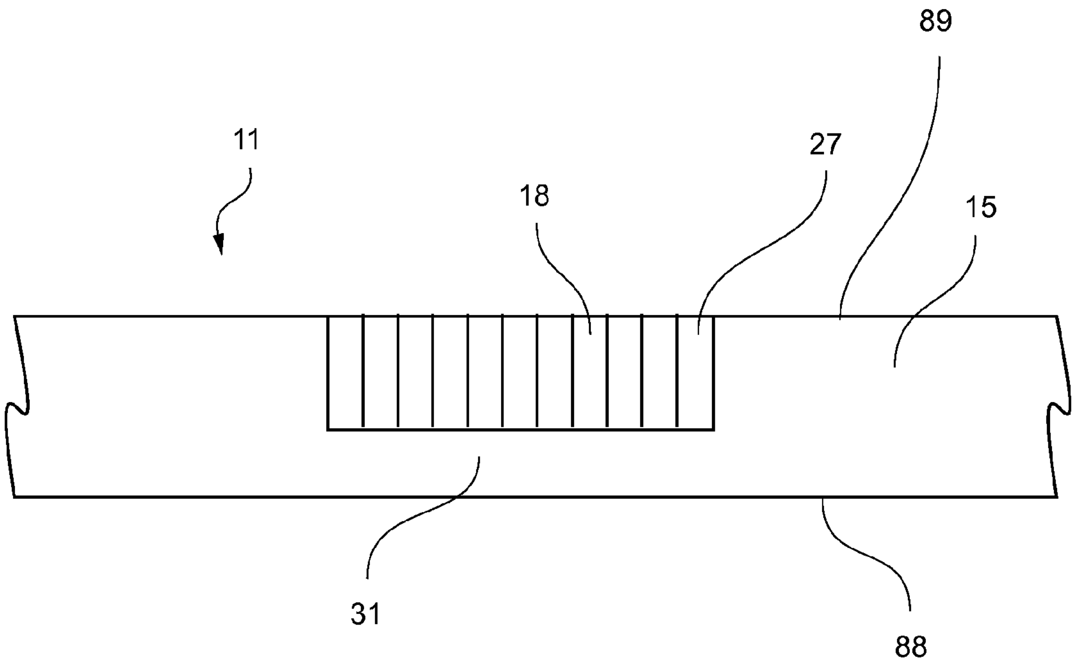
FIG. 3A is side view of the inside of the first handle of the combination pipe cutter and can lid opener according to an alternate embodiment.
Figure 3B:
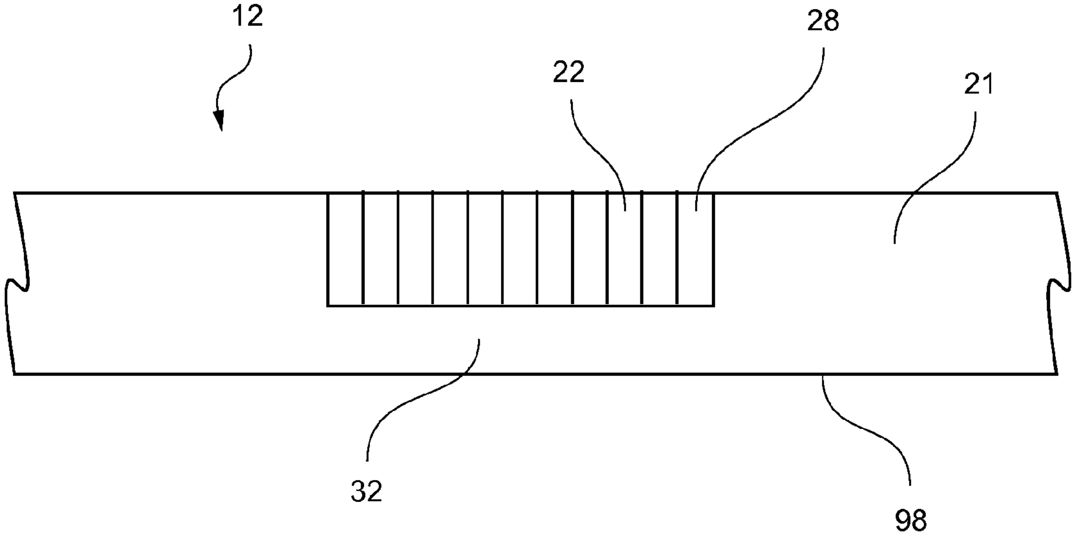
FIG. 3B is side view of the inside of the second handle of the combination pipe cutter and can lid opener according to an alternate embodiment.

Referring now more specifically to FIG. 3A-3B, illustrated therein is an alternate embodiment of combination pipe cutter and can lid opener 10, wherein the alternate embodiment of FIG. 3A-3B is substantially equivalent in form and function to that of the preferred embodiment detailed and illustrated in FIGS. 1-2 except as hereinafter specifically referenced. Specifically, in the embodiment of FIG. 3A-3B, first handle 11 and second handle 12 comprise cutouts 18, 22, respectively with gripping teeth 27, 28, respectively, wherein cutout 18 does not extend fully through inside 15 of first handle 11, and wherein cutout 22 does not extend fully through inside 21 of second handle 12. That is, semicircular cutouts 18,22 extend from fronts 99, 89 partially through handles 11, 12 respectively, but do not extend fully to backs 88, 98 of handles 11, 12, respectively, thereby strengthening first handle 11 and second handle 12 by providing thickened sections 31 and 32, respectively.

In use, alternate embodiment combination pipe cutter and can lid opener 10 opens lid L by disposition of cutout 18 and cutout 22 around the perimeter of lid L. Pressure is subsequently applied to first handle 11 and second handle 12, wherein gripping teeth 17*a* and 17*b* engage lid L and upon turning combination pipe cutter and can lid opener 10, thereby opening lid L.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A combination cutter and can lid opener comprising:

two handles, wherein said two handles each comprises a front, back, and inside, and wherein said insides comprise semicircular openings, and wherein said semicircular openings comprise gripping teeth, and wherein said semicircular openings extend continuously through said insides from said front to said back, and wherein said gripping teeth are disposed extending from said front of said handles partially to said back of said handles; and a means for cutting disposed at a top portion of said two handles, wherein said means for cutting comprises a blade, and wherein one of said two handles further comprises a top, and wherein said top comprises a holder and a blade gap receive said blade, and wherein said blade passes through an object into said blade gap thereby cutting through the object held in said holder.

2. The combination cutter and can lid opener of claim 1, wherein said gripping teeth cooperatively engage the lid of the can.

3. The combination cutter and can lid opener of claim 1, wherein said two handles are hingeably secured together enabling said two handles to perform a scissors movement.

4. The combination cutter and can lid opener of claim 1, wherein at least one of said outsides comprises hand grips.

5. A method of using a tool, said method comprising the steps of:

obtaining said tool, wherein said tool comprises a combination pipe cutter and can lid opener having a blade and two handles, and wherein said blade is disposed at a top portion of one of said two handles, and wherein said two handles each comprises a front, back, outside and inside, and wherein said insides comprise semicircular openings disposed on a bottom portion of each of said two handles, and wherein said semicircular openings comprise gripping teeth, and wherein said semicircular openings extend continuously through said insides from said front to said back, and wherein said gripping teeth are disposed extending from said front of said handles partially to said back of said handles, and wherein the other of said two handles comprises a pipe holder and a blade gap disposed at a top portion of said other of said two handles to receive said blade; and performing an operation with said tool, wherein said operation is selected from the group consisting of cutting the object with said blade and opening a container with said gripping teeth.

6. The method of using a tool of claim 5, said step of performing further comprises the steps of:

placing said gripping teeth around the lid of a container;

squeezing said handles together; and turning said combination pipe cutter and can lid opener, whereby the lid is opened and removed from the container.

7. The method of using a tool of claim 5, wherein said step of performing further comprises the steps of:

placing the object for cutting between said blade and a top portion of one of said two handles; and applying pressure to said outside of said two handles, thereby cutting the object with said blade.

8. A combination apparatus for cutting and opening an object, said combination apparatus comprising a blade and two handles, wherein said blade is disposed at a top portion of one of said two handles, and wherein said two handles each comprises a front, back, inside and outside, and wherein said insides each comprise semicircular openings disposed on lower portions of said two handles, and wherein said semicircular openings extend continuously through said insides from said front to said back, and wherein said semicircular openings comprise gripping teeth, and wherein gripping teeth are disposed extending from said front of said handles partially to said back of said handles, and wherein the other of said two handles comprises a pipe holder and a blade gap disposed at a top portion of said other of said two handles to receive said blade.

9. The combination apparatus for cutting and opening an object of claim 8, wherein said two handles are secured together via a scissors hinge.

10. The combination apparatus for cutting and opening an object of claim 8, wherein at least one of said two handles comprises hand grips disposed on said outside thereof.

* * * * *